United States Patent [19]
Sabat, Jr. et al.

[11] Patent Number: 6,122,529
[45] Date of Patent: Sep. 19, 2000

[54] SIMULCAST WITH HIERARCHICAL CELL STRUCTURE OVERLAY

[75] Inventors: John Sabat, Jr., Merrimack; Thomas J. Johnson; Kenneth C. Greenwood, both of Bedford, all of N.H.

[73] Assignee: Transcept, Inc., Manchester, N.H.

[21] Appl. No.: 09/042,950

[22] Filed: Mar. 17, 1998

[51] Int. Cl.$^7$ ................................................. H04Q 7/20
[52] U.S. Cl. ......................... 455/561; 455/11.1; 455/523
[58] Field of Search ............................. 455/3.1, 6.1, 11.1, 455/422, 426, 432, 436, 446, 449, 560, 561, 562, 14, 523; 348/6, 8, 12, 13

[56] References Cited

U.S. PATENT DOCUMENTS

| | | | |
|---|---|---|---|
| 4,144,411 | 3/1979 | Frenkiel | 455/449 |
| 4,392,245 | 7/1983 | Mitama . | |
| 4,882,765 | 11/1989 | Maxwell et al. | 455/11.1 |
| 4,914,715 | 4/1990 | Miyata . | |
| 5,067,173 | 11/1991 | Gordon et al. . | |
| 5,129,098 | 7/1992 | McGirr et al. . | |
| 5,193,223 | 3/1993 | Walczak et al. . | |
| 5,303,287 | 4/1994 | Laborde | 455/449 |
| 5,321,736 | 6/1994 | Beasley | 455/11.1 |
| 5,327,144 | 7/1994 | Stilp et al. . | |
| 5,343,493 | 8/1994 | Karimullah . | |
| 5,381,459 | 1/1995 | Lappington | 455/450 |
| 5,396,484 | 3/1995 | Itoh . | |
| 5,416,802 | 5/1995 | Ishii . | |
| 5,452,473 | 9/1995 | Weiland et al. . | |
| 5,513,176 | 4/1996 | Dean et al. | 455/562 |
| 5,590,173 | 12/1996 | Beasley . | |
| 5,732,353 | 3/1998 | Haarsten . | |
| 5,768,279 | 6/1998 | Barn et al. . | |
| 5,774,808 | 6/1998 | Sarkioja et al. . | |
| 5,781,541 | 7/1998 | Schneider . | |
| 5,781,859 | 7/1998 | Beasley | 455/11.1 |
| 5,802,173 | 9/1998 | Hamilton-Piercy et al. | 455/561 |
| 5,805,983 | 9/1998 | Naidu et al. . | |
| 5,809,395 | 9/1998 | Hamilton-Piercy et al. . | |
| 5,822,324 | 10/1998 | Kostresti et al. . | |
| 5,825,762 | 10/1998 | Kamin, Jr. et al. . | |
| 5,831,976 | 11/1998 | Lin et al. . | |

FOREIGN PATENT DOCUMENTS 2253770  9/1992  United Kingdom .
2289198  11/1995  United Kingdom .

*Primary Examiner*—Dwayne D. Bost
*Assistant Examiner*—Nay Maung
*Attorney, Agent, or Firm*—Kirkpatrick & Lockhart LLP

[57] ABSTRACT

Apparatus and a method are disclosed for a wireless telephony system to eliminate blind areas where signal coverage is weak or non-existent by providing remote transceivers that are physically located in the blind areas. A central transceiver located with a base telephone station and tower mounted antenna receives wireless telephony signals being transmitted by the antenna to a wireless telephone and forwards it over either an dedicated or existing broadband distribution network, such as a cable television distribution network, to the remote transceiver which transmits the same telephony signals in the blind area to a wireless telephone operating in the blind area. Telephony signals originating from a wireless telephone operating in the blind area are received by the remote transceiver and forwarded over either the dedicated or existing broadband distribution network to the central transceiver which inputs the telephony signals to the base telephone station.

14 Claims, 6 Drawing Sheets

SIMULCAST WITH HIERARCHICAL CELL STRUCTURE OVERLAY

FIELD OF THE INVENTION

The present invention relates to wireless communications systems, and more particularly to an arrangement for improving signal transmission in areas where signal coverage for a main transceiver with tower mounted antenna is poor, non-existent, or interfered with.

BACKGROUND OF THE INVENTION

The prior art teaches wireless telephony wherein remotely located transceivers having tower mounted antennas are typically located on hill tops or atop tall buildings to provide communications between wireless telephones operating in a physical area, called a cell, and the telephone system. Physical characteristics of the geographical area covered by such a prior art transceiver may include other hills, tall buildings and other obstructions which create areas, or "blind spots", in which communications between a wireless telephone and the remote transceiver that is assigned to handle the wireless telephony traffic for the area or cell is poor or non-existent. Physical characteristics and initial network design also lead to interference situations that also lead to poor call quality or interruption of wireless telephone service.

Prior art approaches to solving these problem have been to make the antenna tower higher and to increase the transmitted power, but even these solutions sometimes have not been able to eliminate all such blind spots and there is loss of signal transmission in these areas.

SUMMARY OF THE INVENTION

Thus, there is a need in the wireless telephony art for apparatus and a method to eliminate areas in which communications between a wireless telephone and a remote transceiver with tower mounted antenna is poor, non-existent, or interfered with, and results in poor signal to noise ratio. This need in the wireless telephony art is satisfied by the present invention.

The present invention is implemented using elements that are known in prior art wireless telephony systems. One such wireless telephony system is taught in U.S. patent application Ser. No. 8/695,175, filed Aug. 1, 1996, and entitled "Apparatus And Method For Distributing Wireless Communications Signals To Remote Cellular Antennas". The telephony system disclosed therein, and shown in FIG. 1, includes a base transceiver station (BTS) which is connected to a telephone system. The BTS is also connected to a Remote Antenna Signal Processor (RASP) which is the interface to a Broadband Distribution Network. Telephony signals to be sent between the telephone system and wireless telephones are carried via the broadband network using the RASPs and the Remote Antenna Drivers (RADs).

As is known in the prior art, including the above cited prior art patent application, one or more frequency bands or channels of the Broadband Distribution Network are assigned to carry telephony communications and control signals between a telephone system and wireless telephones. Telephony signals originating from telephone system are transmitted by a RASP, in frequency division multiplexing format, via the Broadband Distribution Network to a plurality of RADs 118 which are connected to the Broadband Distribution Network. Telephony signals originating at wireless telephones are frequency multiplexed together by the RADs and are transmitted along with control and gain tone signals via the Broadband Distribution Network to a RASP, and thence to a BTS and the telephone system.

The present invention is implemented as follows. A Remote Antenna Driver (RAD) is physically located in each blind area in which communications between wireless telephones and a Base Transceiver Station (BTS) with tower mounted antenna is poor, non-existent, or interfered with. These RADs are hung on and are connected to either a dedicated cable or the cabling of a conventional hybrid fiber coaxial (HFC) cable distribution system of the type used for cable television distribution networks, or dedicated fiber optic cable. These RADs are powered via the cable in the same manner that cable television line amplifiers receive power over the cable. For the dedicated fiber cable a local power source is required. The RADs utilize an assigned bandwidth on the cable/fiber to transmit to and receive telephony signals from a BTS as mentioned above. Wireless telephony signals are transmitted and received by each RAD at approximately the same time they are transmitted and received by the BTS with which each RAD is associated because a delay is induced relative to the cable/fiber distance between the RASP and RAD. In this manner proper signal coverage is provided to the blind areas.

More particularly, each BTS that has a RAD associated therewith to provide signal coverage to a blind area also has a Remote Antenna Signal Processor (RASP) located therewith. The RASP takes encoded telephony signals from a BTS, adds RAD control signals (element management), and transmits them both via the broadband distribution network to the remote RAD which simultaneously transmits ("simulcast") them in the blind area. They are simulcast in the sense that more than one RAD is radiating the same signal, or a combination of RADs and a tower based transceiver. Encoded telephony signals received by the RAD from a wireless telephone in the blind area, and RAD generated control signals (element management), are sent by the RAD via the broadband distribution network to the RASP which remove the control signals and forwards the encoded telephony signals to the BTS and finally the associated telephone system.

DESCRIPTION OF THE DRAWING

The invention will be better understood upon reading the following Detailed Description in conjunction with the drawing in which.

DETAILED DESCRIPTION

Figure 1:
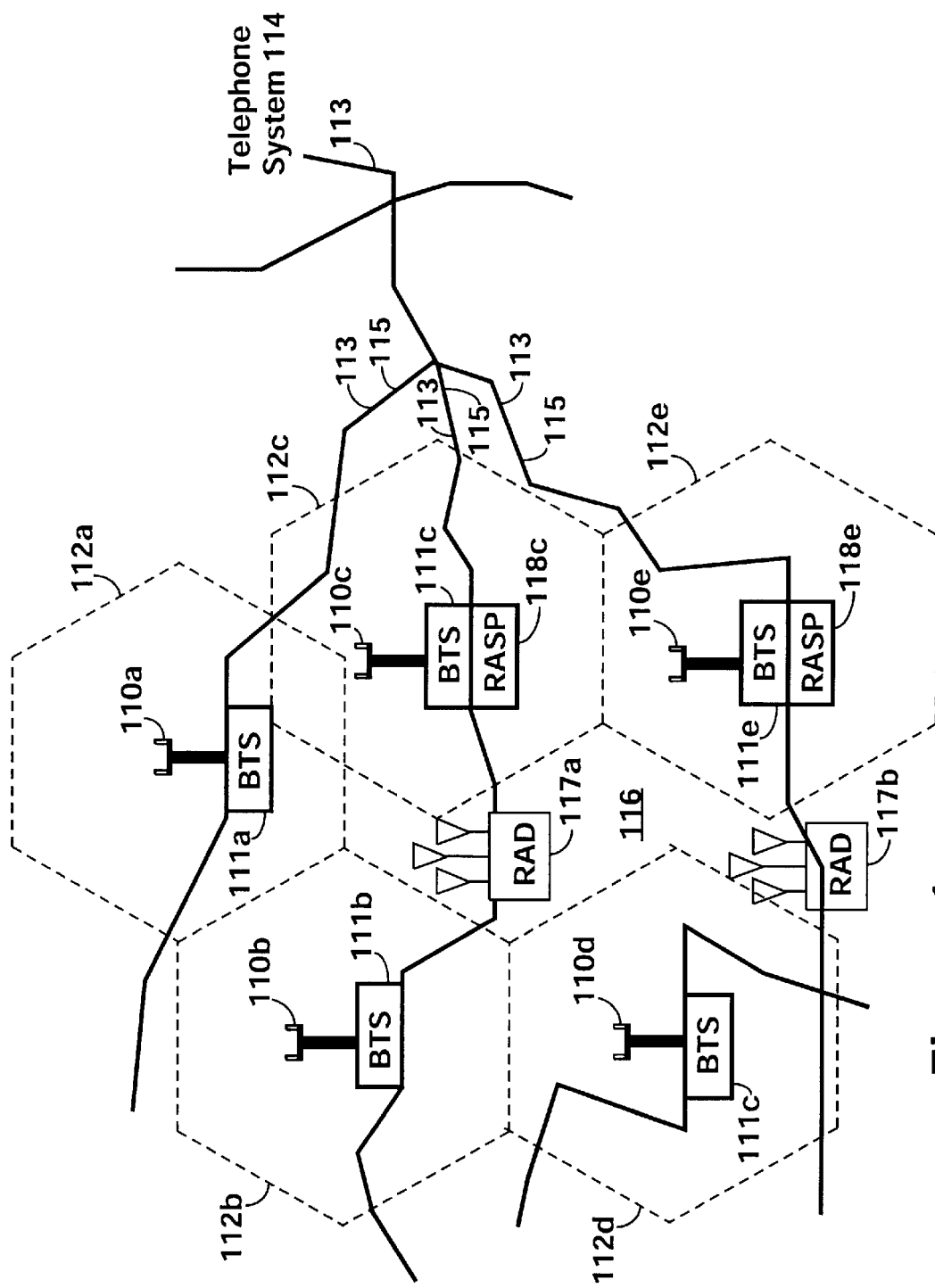
FIG. 1 is a block diagram of a typical wireless telephony system utilizing remote transceivers (BTSs) and antenna towers integrated with RADs and a Broadband Distribution Network in accordance with the teaching of the present invention.

In the drawing and following detailed description all circuit elements are assigned three digit reference numbers. The first digit of each reference number indicates in which Figure of the drawing an element is shown. The second and third digits of each reference number indicate specific circuit elements. If the same circuit element appears in more than one Figure of the drawing, the second and third digits of the reference number for that circuit element remain the same and only the first digit of the reference number changes to indicate the Figure of the drawing in which the circuit element is located. Thus, RAD 217 in FIG. 2 is the same RAD labeled 117 in FIG. 1.

The term "reverse direction" refers to any signals traveling from a RAD 117 toward Telephone System 114, and the term "forward direction" refers to any signals traveling from Telephone System 114 toward a RAD 117. In the cable television industry the "forward direction" is referred to as "downstream", and the "reverse direction" is referred to as "upstream". This is mentioned because the present invention may be implemented into a wireless telephone system as described herein utilizing a cable television distribution cable. Other distribution networks such as fiber optic, wireless, and other types of networks that may exist in the future; and such networks may be dedicated or shared. As used herein the term "telephony signals" includes voice, data, facsimile and any other type of signals that are sent over a telephone network now or the future. Throughout this Detailed Description, when FIGS. 3 through 7 are being described, reference is often made to an element such as RAD 117, RASP 118 and BTS 111 in FIG. 1 to remind the reader what circuits these Figures are part of, although the reference numbers 111, 117 and 118 do not actually appear in the Figure being described.

Wireless telephony systems commonly utilize a plurality of remote transceivers (Base Transceiver Stations) with associated antenna towers on hilltops to handle wireless telephone traffic in a number of contiguous areas called cells. Despite multiple transceivers (BTSs) being located to provide area coverage, and even overlapping areas of signal coverage, there may still be "blind" areas of signal coverage caused by hills, tunnels, tall structures, etc. With the present invention a transceiver called a Remote Antenna Driver (RAD) is physically located in each blind area to provide signal coverage therein. The RAD is connected via a broadband distribution network, such as cable television cable or dedicated fiber strand/byndle, to a Remote Antenna Signal Processor (RASP) which is co-located with the existing Base Transceiver Station (BTS) with tower mounted antenna.

An encoded telephony signal being transmitted by a BTS using its hilltop antenna is also carried via a dedicated cable or a broadband distribution cable or dedicated fiber strand/bundle in the blind area to the associated RADs to be simultaneously broadcast ("simulcast") in the blind area. Signals being received by the RAD from a wireless telephone are carried by the dedicated cable or broadband distribution cable or fiber and combined with the signal being received by the hilltop antenna. In this way, using RADs within the coverage area of a hilltop antenna may be shaped, and also used to cover blind spots. This is different than a repeater to and from which signals that are to be repeated are transmitted to and from the BTS over the airwaves, not by a dedicated cable/fiber, and be received in areas where the transmitted signal may cause other spectrally related reception problems.

Figure 2:
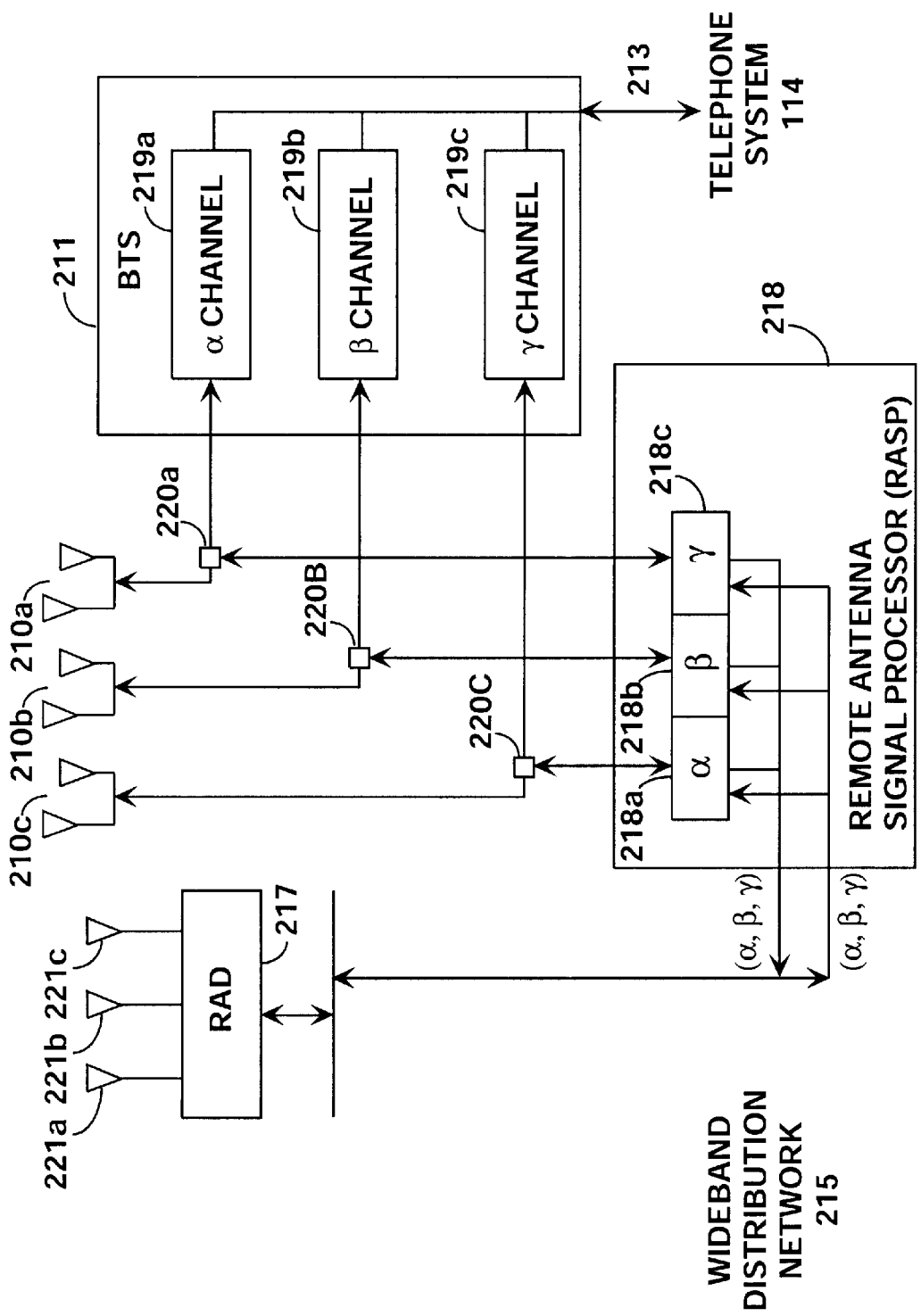
FIG. 2 is a more detailed block diagram of the circuitry implementing the teaching of the present invention integrated with a wireless telephony system utilizing remote transceivers (BTSs) and antenna towers.

In FIG. 1 is shown a diagram of a conventional wireless telephony system which utilizes a number of antenna towers 110a–e, typically located on hilltops or other high locations such as tall buildings, to provide wireless telephone signal coverage in assigned cells 112a–e. As is known in the prior art, the signal coverage of each cell 112a–e provides complementary and sometimes overlapping coverage with adjacent cells. Each antenna tower 110a–e has a Base Transceiver Station (BTS) 111a–e associated therewith as is known in the art. Each BTS 111a–e encodes analog or digital telephony signals received from a telephone system 114 for transmission to wireless telephones. The type of decoding that is done depends upon the type of system and includes, but is not limited to, the well-known CDMA and GSM systems.

BTSs 111a–e are connected via a telephone distribution network 113 to a telephone system 114 in a manner well known in the art. Telephone distribution network 113 is often a T1 carrier. Telephone distribution network 113 is comprised of wire, coaxial cable, fiber-optic cable, and radio links as is also known in the art. Wire, coaxial cable, and fiber-optic cable are often hung on telephone poles (not shown), but are also buried. Often hung on the same telephone poles is a cable television distribution network 115 which usually comprise coaxial and fiber-optic cable as previously mentioned. For this reason, in FIG. 1 only single, dark lines are shown, designated both 113 and 115 to represent both telephone distribution network 113 and cable television distribution network 115. In FIG. 1 there are three branches, all designated 113 and 115. In the following description, the cable television distribution network is referred to as a broadband distribution network since any broadband network may be utilized.

In a manner well known in the prior art, as a wireless telephone (not shown) moves from one cell to another cell, such as from cell 112a to 112c, it is "handed off" to cell 112c to maintain wireless telephone signal coverage.

As may be seen in FIG. 1 there is an area designated 116 that represents a physical area in which wireless telephone service is not adequately provided due to hills, tunnels and/or tall structures. Utilizing the teaching of the present invention, improved wireless telephone service is provided in blind areas such as area 116.

To provide this improved wireless telephone service in a blind area 116, wireless communications signals carried between a wireless telephone (not shown) in an area 116 and a BTS 111 are carried over an alternate path, which includes a Remote Antenna Signal Processor (RASP) 118, broadband distribution network 115, and Remote Antenna Drivers (RADs) 117a&b. Thus, for example, at the same time that an encoded telephony signal, which originated at Telephone System 114, and destined for a wireless telephone (not shown) located in blind area 116, is being transmitted by BTS 111c and antenna 110c; the same encoded telephony signal is also sent via RASP 118c in a frequency division multiplexing format over broadband distribution network 115 to RAD 117a which simultaneously transmits ("simulcasts") at low power the same telephony signal in area 116. It should again be noted that other broadband distribution networks, other than cable television distribution network 115, may be utilized to connect each RASP 118 and RAD 117. Alternatively, a dedicated cable may be provided to interconnect each RASP 118 and RAD 117.

Telephony signals originating from a wireless telephone (not shown) located in area 116 are received by RAD 117a which adds control signals and sends them in frequency division multiplexed signaling via broadband distribution network 115 and RASP 118c to BTS 111c. If the wireless telephone is in the portion of area 116 closer to cell 112e, its telephony signals are carried by RAD 117b and RASP 118e. More detailed descriptions of the operation of RADs 117 and RASPs 118 are given further in this Detailed Description.

In each of BTSs 111a–e are a plurality of transceiver modules (not shown), as is known in the wireless telephony art, each of which operates at a single channel frequency at a time, and which can handle a predetermined maximum number of telephone calls from wireless telephones. In the wireless telephony art, these transceiver modules in the base transceiver stations 111 are also referred to as channel card modules and radio modules.

Each RAD 117a&b has three antennas, as shown, used to transmit signals to and receive signals from remote wireless telephones (not shown) operating in blind area 116. One antenna is used to transmit encoded, wireless telephony signals to wireless telephones, while the other two antennas are used to receive wireless encoded, telephony signals from wireless telephones. One receive antenna is called the primary antenna, and the other receive antenna is called the diversity antenna. The two receive antennas are physically spaced and cooperate to minimize signal fading and thereby provide continuous signal reception from wireless telephones.

In FIG. 2 is shown a block diagram of a prior art BTS 211 with tower mounted antennas 210, and the implementation of the present invention showing how a RASP 218, Broadband Distribution Network 215, and RAD 217 are integrated with a BTS 211. As previously mentioned, BTS 211 is connected via a telephone distribution network 213 to a telephone system 114.

Each prior art BTS 211 has three channel circuits designated alpha 219a, beta 219b, and gamma 219c. Each of these three channel circuits 219a–c receives analog or digital telephony signals from telephone system 114, and encodes them. The type of encoding that is done depends upon the type of wireless telephone system and includes, but is not limited to, the well-known CDMA and GSM systems. The encoded signals are transmitted via a transmit antenna 210 to be received by a wireless telephone (not shown) operating in the cell in which BTS 111 is located. In FIG. 2 three sets of antennas 210 are shown. Antenna 210a is used by channel circuit 219a, antenna 210b is used by channel circuit 219b, and antenna 210c is used by channel circuit 219c.

In addition, each of the three prior art channel circuits 219a–c receives encoded telephony signals via its associated antenna 210a–c from wireless telephones (not shown) operating in the cell in which BTS 211 is located. The particular one of channel circuits 219a–c that receives the signals decodes the telephony signal to analog or digital format and sends it via telephone distribution network 213 to telephone system 114.

In accordance with the teaching of the present invention, a directional coupler 220a–c is connected between each of the channel circuits 219a–c and its associated one of antennas 210a–c. These couplers 220a–c are used to tap off telephony signals being transmitted via antennas 210a–c and, using RASP 218 and Broadband Distribution Network 215, sends the encoded telephony signals to RAD 217 for simultaneous ("simulcast") transmission in blind area 116. These directional couplers 220a–c are also used to take telephony signals received by RAD 217 from wireless telephones (not shown) operating in blind area 116 and combine them with signals being received by antennas 210a–c for input to BTS 211 channel circuits 219a–c. The coupler can include electronic interfaces as well.

There is a RASP 218 assigned to each BTS 211, and each RASP 218 has three channel circuits designated alpha channel 218a, beta channel 218b, and gamma channel 218c that correspond to the alpha, beta and gamma channels 219a–c in BTS 211, as shown in FIG. 2. The circuitry in channel circuits 218a–c of RASP 218 translates the frequency of encoded telephony signals passing between RAD 217 and BTS 211, as necessary for transmission over the Broadband Distribution Network 215. In addition, the circuitry in channel circuits 218a–c of RASP 218 adds control signals to encoded telephony signals going to RAD 217, and separates control signals generated by RAD 217 from encoded telephony signals received from RAD 217. This operation is described in greater detail further in this Detailed Description.

Figure 3:
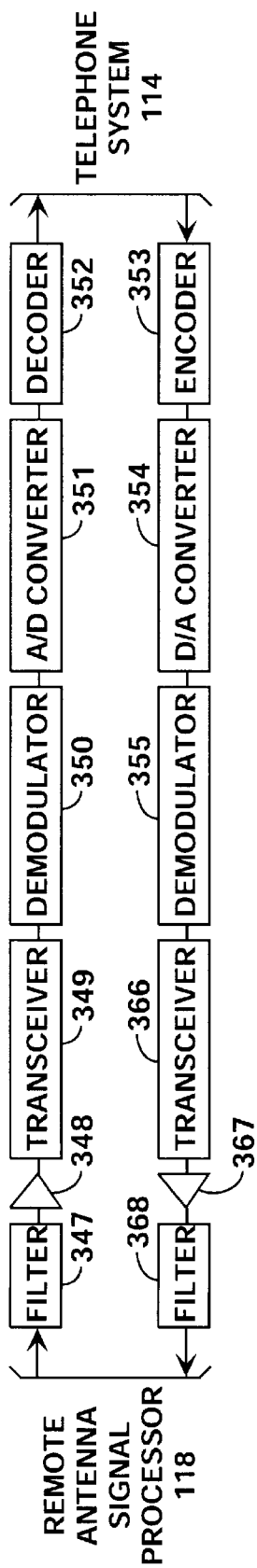
FIG. 3 is a general block diagram of a typical Base Transceiver Station (BTS) used in a wireless telephony system to carry telephony signals between a telephone system and a tower mounted antenna, and which also interfaces with the circuitry implementing the teaching of the present invention.

RAD 217 has three antennas 221a–221c. Antenna 221a is used to transmit telephony signals that originated at telephone system 114 and being sent to a wireless telephone (not shown) in blind area 116. Antennas 221b and 221c are both receive antennas, with antenna 221b being called the primary receive antenna, and antenna 221c being called the secondary receive antenna. Antennas 221b&c both receive telephony signals originating from a wireless telephone (not shown) in blind area 116 and forwards both signals in frequency multiplexed format to RASP 218. Antennas 221b&c are physically spaced and cooperate to minimize signal fading and thereby provide continuous signal reception from wireless telephones operating in blind area 116. The operation of RAD 217 is described in greater detail further in this Detailed Description Turning now to FIG. 3, therein is shown a general block diagram of a typical prior art Base Transceiver Station (BTS) 311 used in a prior art wireless telephony system. As mentioned above in the description of FIG. 2, there are three channel circuits in each BTS. As all three channel circuits are identical, only the alpha channel circuitry 319a is shown in FIG. 3 for the sake of simplicity. In FIG. 3 are two rows of circuits. The upper row of FIG. 3 shows the reverse direction circuitry of alpha channel 319a that carries telephony signals from a wireless telephone (not shown) to telephone system 114. The lower row of FIG. 3 shows the forward direction circuitry of alpha channel 319a that carries telephony signals originating at telephone system 114 and carries them toward a wireless telephone (not shown).

In the reverse direction of alpha channel 319a of BTS 311, an RF carrier signal, modulated with an encoded wireless telephony signal that is received by antenna 210a, or is received via a RAD 117 in blind area 116 via the alpha channel 218a of the associated RASP 218, is input via bidirectional coupler 220a to filter 347 which removes spurious signals at the input of BTS 311. The received RF carrier signal is then amplified by amplifier 348 and input to transceiver 349. Transceiver 349 is used to translate the frequency of the RF carrier signal, received from either RASP circuit 218a or antenna 210a, via bidirectional coupler 220a, to an IF carrier signal which is input to demodulator 350. Demodulator 350 extracts the encoded telephony signal from the IF carrier signal in a manner well-known in the art. In different prior art BTSs 311 the decoded signal may either be an analog or digital signal, depending on the type of system. In the wireless telephony system described herein, the well known GSM system is used wherein the carrier signal is phase shift key modulated. Upon demodulation in demodulator 350 the encoded, analog telephony signal is extracted. The encoded, analog telephony signal is then input to analog to digital converter 351 which digitizes the encoded analog telephony signal. The now digitized and encoded telephony signal is then input to decoder 352 which decodes the signal to obtain the digitized telephony signal which is then sent to Telephone System 114. The type of decoding that is done depends upon the system, and the types include, but are not limited to, the well-known CDMA and GSM systems.

In the forward direction of alpha channel 319a of BTS 311, shown in the bottom row of FIG. 3, digitized telephony signals received from Telephone System 115 are input to encoder 353. The type of encoding that is done depends upon the type of system and includes, but is not limited to, the well-known CDMA and GSM systems. The encoded digital telephony signal is then input to digital to analog converter 354 which converts the telephony signal into an analog signal. The analog, encoded telephony signal is then input to modulator 355 which, in the prior art Base Transceiver Station (BTS) 116 shown in FIG. 6, phase shift key modulates an IF carrier signal in a matter well-known in the art. The IF carrier signal, modulated by the analog, encoded telephony signal, is then input to transceiver 366 which translates the IF carrier signal frequency to an RF carrier signal. The modulated RF carrier signal is then amplified by amplifier 367, spurious signals are filtered out by filter 368 and the RF carrier signal is sent to RASP 218. RASP 218 receives the RF carrier signal and processes it in the manner described in greater detail further in this Detailed Specification.

Figure 4:
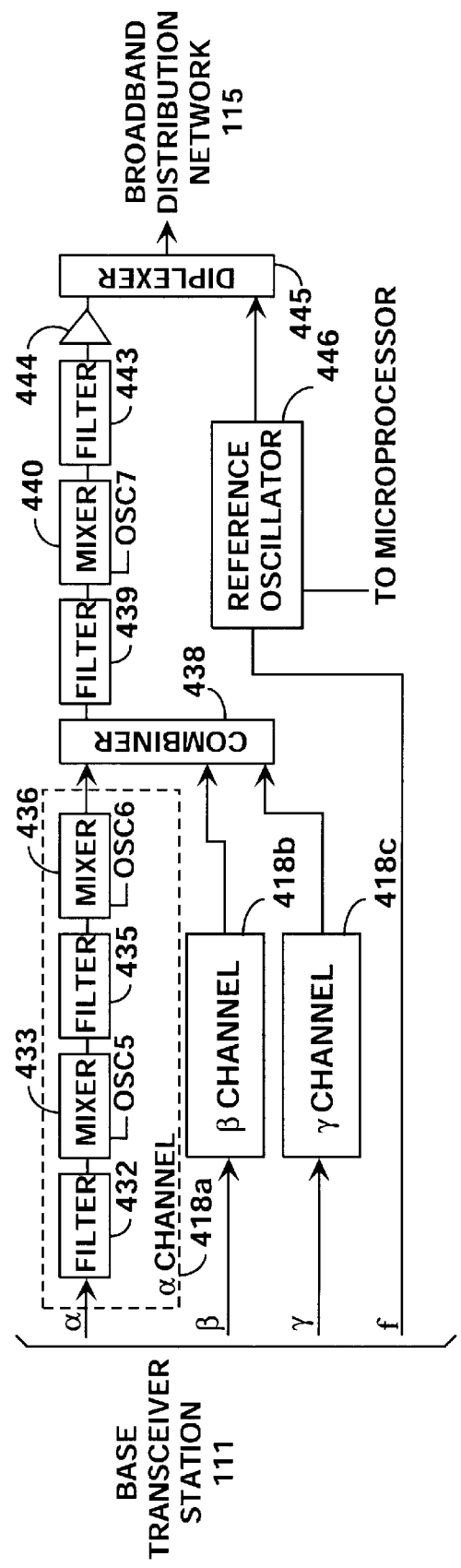
FIG. 4 is a detailed block diagram of the portion of a Remote Antenna Signal Processor (RASP) which is connected to a Base Transceiver Station (BTS) and transmits telephony signals originating at the telephone system, via a broadband distribution network to a Remote Antenna Driver (RAD) which is located in an area in which tower mounted antenna signal coverage is poor, non-existent, or interfered with, in accordance with the teaching of the present invention.

In FIG. 4 is shown a detailed block diagram of the portion of the Remote Antenna Signal Processor (RASP) 218 in FIG. 2 that processes telephony signals received from the Base Transceiver Station (BTS) 211 and forwards them via Broadband Distribution Network 215 and RAD 117 to a wireless telephone (not shown) in blind area 116.

Within the RASP circuit are three parallel circuits 418a–c. These three circuits are referred to as alpha, beta and gamma channels in the RASP and they operate in the same manner except for their frequency of operation. To simplify the description of the RASP circuit, only one of these three circuits, alpha channel 418a, is shown and described in detail. Common circuitry is also described.

Telephony signals received from BTS 111 on the alpha channel 218a are input to bandpass filter 432 to remove all out of band signals. The filtered telephony signals are then input to mixer 433 along with a signal from oscillator OSC5. The heterodyning process of mixer 433 produces a number of unwanted signals which are removed by bandpass filter 435 which passes only the desired telephony signals at an IF frequency.

The filtered telephony signals in alpha channel 418a are then input to a second mixer 436 along with input from oscillator OSC6. Oscillator OSC6, and other oscillators in the alpha, beta and gamma channels, are each controlled by a microprocessor (not shown) and are set to different frequencies depending on the frequencies that the frequency multiplexed telephony signals in the alpha, beta and gamma channel are to be transmitted over Broadband Distribution Network 115.

All signals output from mixer 436 are input to combiner 438 which also has similar inputs from the mixers (not shown) in the beta and gamma channels. Combiner 438 combines the signals from the alpha, beta and gamma channels 218a–c into a first frequency multiplexed signal which is input to bandpass filter 439 where all unwanted frequencies from the heterodyning process are removed. Only the desired telephony signals on the alpha, beta and gamma channels are passed through filter 439 to mixer 440.

Mixer 440 is used to shift the frequency of the telephony signals to their assigned frequency on broadband distribution network 115. To accomplish this mixing process there is another input to mixer 440 from oscillator OSC7. The frequency of oscillator OSC7 is set by the microprocessor (not shown).

As known in the art the output of mixer 440 includes many unwanted signals which are removed by bandpass filter 443. Bandpass filter 443 only passes the desired frequency multiplexed telephony signals in the alpha, beta and gamma channels.

The frequency multiplexed telephony signals from all three channels are amplified by amplifier 444 before being input to diplexer 445. There is a second input to diplexer 445 that is now described.

On lead f from BTS 111 is a reference signal received from BTS 111. This reference signal is used by all oscillators in RASP 118, and is also transmitted to and used as a reference oscillator signal for all local oscillators in RADs 117.

Figure 5:
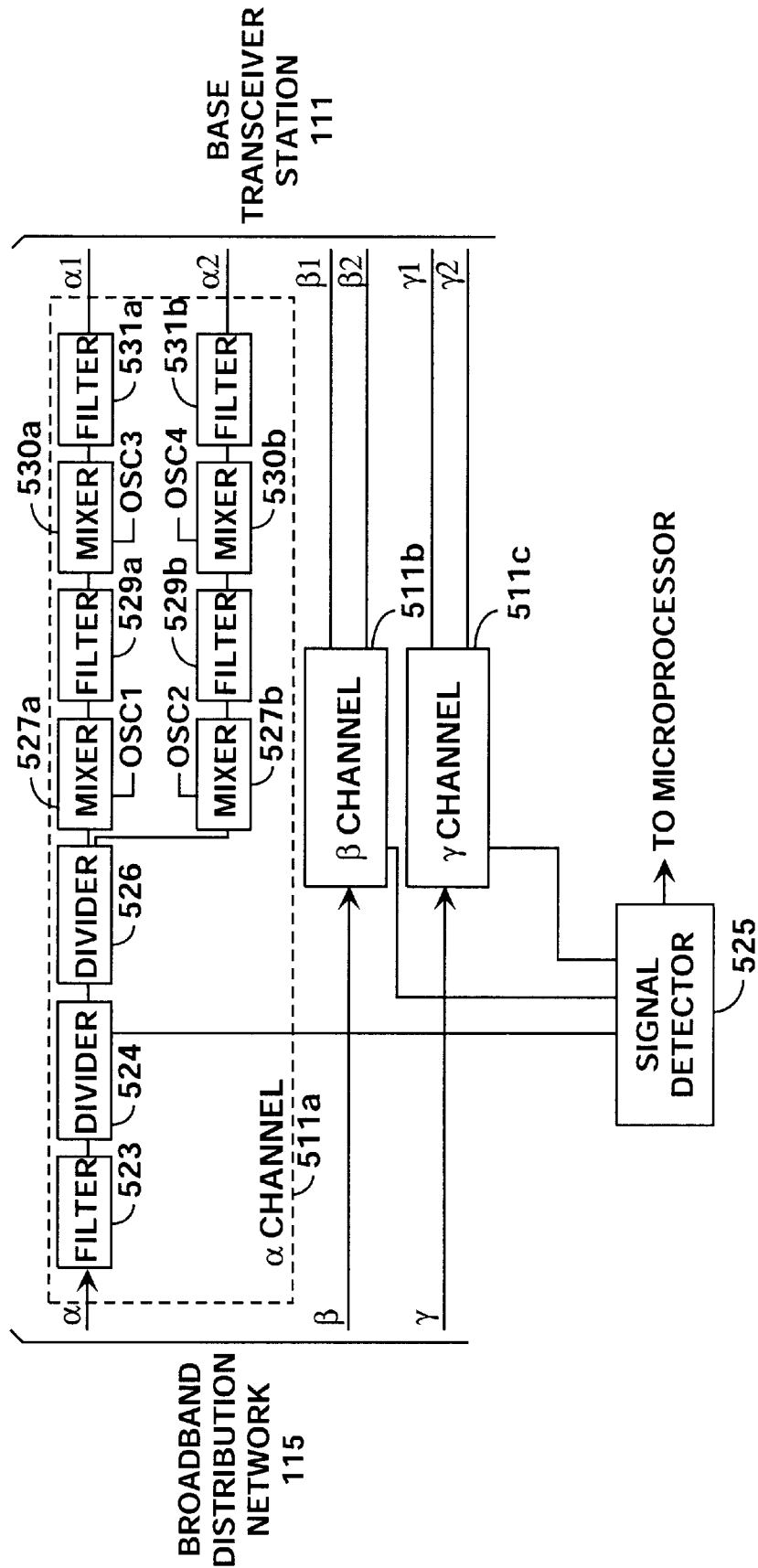
FIG. 5 is a detailed block diagram of the portion of a Remote Antenna Signal Processor (RASP) which is connected to a Base Transceiver Station (BTS) and receives telephony signals originating at wireless telephones and carried via the broadband distribution network from a Remote Antenna Driver (RAD) which is located in an area in which tower mounted antenna signal coverage is poor, non-existent, or interfered with, in accordance with the teaching of the present invention.

In FIG. 5 is shown a block diagram of the reverse direction portion of a Remote Antenna Signal Processor (RASP) 118. The reverse direction circuitry processes telephony and control signals received from wireless telephones (not shown) and RADs 117, and received via Broadband Distribution Network 115, and forwards them to BTS 111.

Within the RASP circuit are three parallel channel circuits 511a, 511b and 511c. These three circuits are referred to as alpha, beta and gamma channels and they operate in the same manner except for their frequency of operation to handle telephony signals in different channels. To simplify the description of the reverse direction RASP circuit shown in FIG. 5, only alpha channel circuit 511a is described in detail. There may be more than three such channel circuits in a RASP.

Telephony signals from a wireless telephone (not shown), and control signals from a RAD 117 that is carrying the telephony signals, are carried over Broadband Distribution Network 115 to bandpass filter 523 at the input of alpha channel 511a. These telephony and control signals are divided for further processing as described further in this detailed description. Filter 523 removes out of band signals that are present on Broadband Distribution Network 115 before the telephony and control signals are input to signal divider 524. Divider 524 divides and applies the combined telephony and control signals to both divider 526 and signal detector 525.

Signal detector 525 separates the control signals from the telephony signal and forwards the control signals to a microprocessor (not shown) for processing. The microprocessor analyzes the control signals and causes circuit adjustments to be made in RASP 118 and RAD 117.

Divider 524 also applies the telephony signal to divider 526 which again divides the signal, which telephony signal includes the combined signals from the primary receive antenna and diversity receive antenna of a RAD 117, and applies them to mixers 527a and 527b. As briefly described hereinabove, the telephony signal received by the primary receive antenna and diversity receive antenna from a single RAD 117 are frequency multiplexed together. Mixers 527a and 527b are used to separate these two frequency multiplexed telephony signals.

Mixer 527a has a second input from oscillator OSC1, and mixer 527b has a second input from oscillator OSC2. The frequency of oscillators OSC1 and OSC2 are different and the mixing process of mixers 527a and 527b causes the modulated carrier signal output from each of the mixers to have the same intermediate frequency (IF) carrier signal. The frequency of oscillators OSC1 and OSC2 are controlled by the microprocessor (not shown) and are set according to the assigned frequency of operation for the alpha channel on Broadband Distribution Network 115.

The heterodyning process of mixers 527a and 527b produce a number of unwanted signals which are removed respectively by bandpass filters 529a and 529b, and which respectively pass only the desired telephony signal from the primary receive antenna and the diversity receive antenna.

Only the primary receive antenna telephony signal is output from filter 529a and is input to mixer 530a where it is mixed with a signal from oscillator OSC3. The heterodyning process of mixer 530a is used to translate the intermediate frequency (IF) carrier signal, modulated with the primary receive antenna telephony signal, to a radio frequency (RF) carrier signal that is transmitted via path alpha 1 to BTS 111. The heterodyning process of mixer 530a also produces a number of unwanted signals that are removed by bandpass filter 531a.

Only the secondary receive antenna telephony signal is output from filter 529b and is input to mixer 530b where it is mixed with a signal from oscillator OSC4. The heterodyning process of mixer 530b is used to translate the IF carrier signal, modulated with the secondary receive antenna telephony signal, to an RF carrier signal that is transmitted via path alpha 2 to BTS 111. The heterodyning process of mixer 530b also produces a number of unwanted signals that are removed by bandpass filter 531b.

Figure 6:
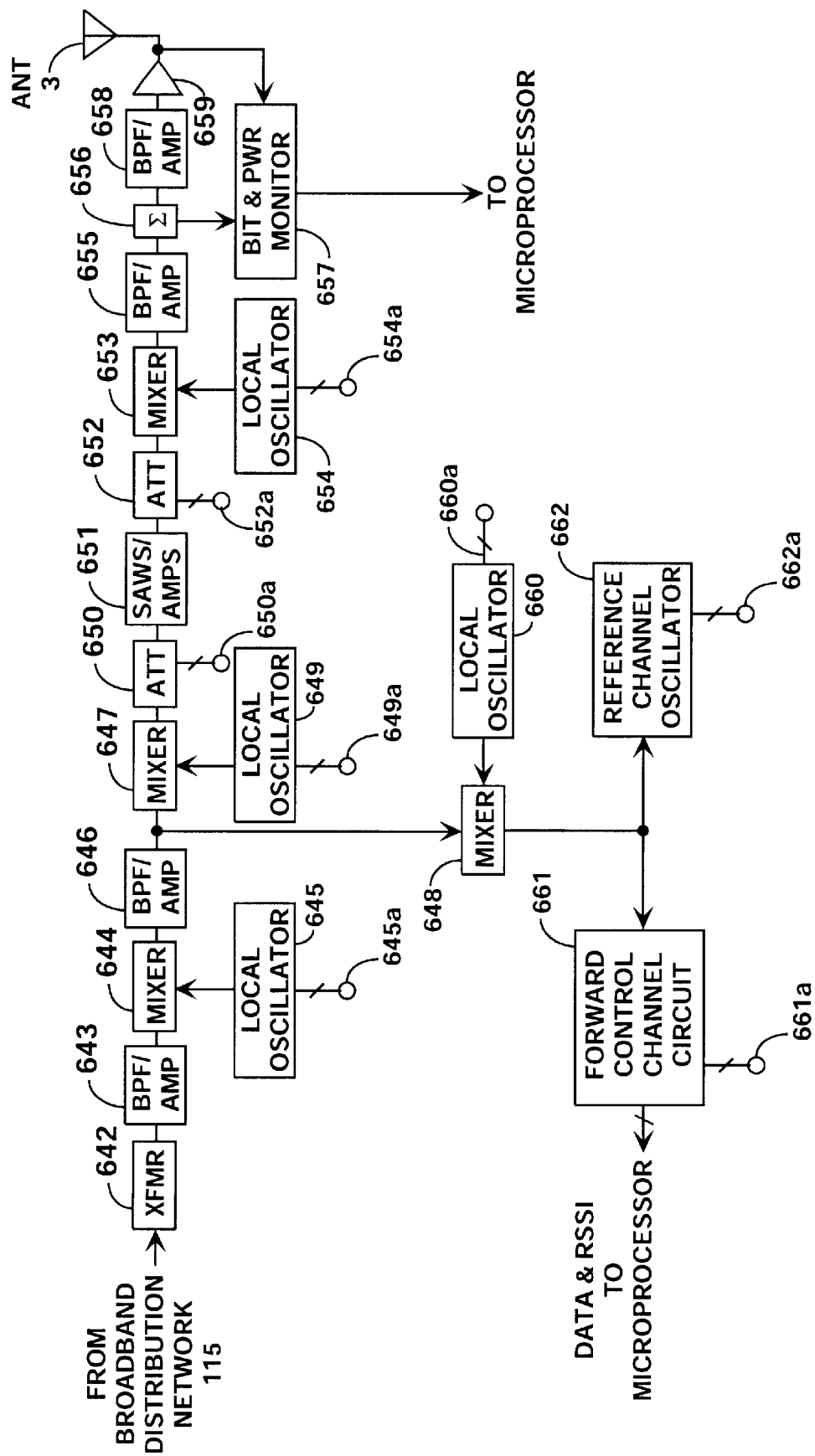
FIG. 6 is a detailed block diagram of the portion of a Remote Antenna Driver (RAD) that transmits telephony signals received via a Broadband Distribution Network from a Base Transceiver Station (BTS) and a RASP to wireless telephones in accordance with the teaching of the present invention.

In FIG. 6 is shown a detailed block diagram of the downstream or forward circuitry of RAD 117 that carries telephony signals to wireless telephones (not shown). As previously described, RAD 117 hangs from and is connected to Broadband Distribution Network 115. Transformer 642 is an impedance matching transformer having 75 ohm primary and 50 ohm secondary windings. When Broadband Distribution Network 115 is coaxial cable, the primary winding of transformer 642 is wired in series with the center conductor of the coaxial cable. Transformer 642 is used to connect frequency multiplexed telephony and control signals carried on Broadband Distribution Network 115 from RASP 118 to the input of this RAD circuit. Only a RAD 117, the receive frequency of which has been tuned to the particular frequency of telephony and control signals on Broadband Distribution Network 115 can actually receive and forward the telephony signals to a wireless telephone (not shown).

All RADs 117 connected to Broadband Distribution Network 115 receive control signals directed toward any one of the RADs. However, each RAD 117 has a unique address that prefixes each control signal and is used by each RAD 117 to accept only control signals directed specifically to it by RASP 118.

The frequency multiplexed telephony and control signals received by the RAD circuitry in FIG. 6 from Broadband Distribution Network 115 are input to band pass filter and amplifier 643. Filter 643 passes all possible frequency multiplexed telephony and control signals that are carried on Broadband Distribution Network 115, and excludes other unwanted signals carried on Network 115. Circuit 643 also amplifies the signals that pass through filter 642.

The signals output from filter 643 are input to mixer 644 along with a signal from local oscillator 645. Alike other local oscillators shown in FIG. 6, the frequency of local oscillator 645 is digitally controlled at its input 645a by a microprocessor (not shown) responsive to frequency reference signals received from RASP 118, as briefly described hereinabove.

The operation of mixer 644 results in multiple frequencies being output from the mixer as is known in the art and unwanted frequencies are blocked by band pass filter and amplifier 646 which passes only desired signals. The selected set of telephony and control signals are amplified and are input to mixer 647. As mentioned above local oscillator 649 is digitally controlled at its control input 649a by the microprocessor (not shown) responsive to reference signals received from RASP 118. In a manner well-known in the art, mixer 647 combines the signals input to it and provides a number of output signals at different frequencies. All these frequencies are input to an attenuator 650 which is used to adjust the gain level of the signals. Attenuator 650 is part of the gain control system and is digitally controlled at its input 650a in ½ dB steps by the microprocessor (not shown), responsive to gain control signals received from RASP 118.

The gain adjusted signal output from attenuator 650 is input to SAW filter and amplifier 651. Due to the sharp filtering operation of SAW filter 651, even spurious signals close to the desired telephony and control signals are removed. Control signals frequency multiplexed with the telephony signal do not pass through SAW filter 651. Instead, the control signals are input to mixer 648 as is described further in this specification.

The telephony signals passing through SAW filter 651 are input to digitally controlled attenuator 652 to adjust the gain level of the signal before it is input to mixer 653 along with the output of microprocessor controlled local oscillator 654. Attenuator 652 is part of the gain control system and is digitally controlled at its control input 652a in 2 dB steps by the microprocessor (not shown), responsive to gain control signals received from RASP 118.

The amplitude adjusted telephony signal output from attenuator 652 is input to mixer 653 along with a signal from digitally controlled oscillator 654. Oscillator 654 is also controlled by the microprocessor, responsive to gain control signals received from RASP 118, in the same manner as local oscillators 645, 649 and 660. Mixer 653 combines the two signals in a manner well-known in the art to produce several output signals, one of which is the telephony signal now having the desired RF carrier frequency for transmission of the telephony signal to a remote wireless telephone (not shown). The signals output from mixer 653 are input to band pass filter and amplifier 655. Band pass filter 655 passes only the desired RF carrier frequency. The signal is also amplified before being input to signal divider 656.

A portion of the telephony signal input to divider 656 is divided and input to bit and power monitor 657, while the remainder of the signal is input to band pass filter and amplifier 658. Bandpass filter 658 assures that there are no extraneous signals combined with the desired telephony signal, amplifies same, and applies it to power amplifier 659. Power amplifier 659 amplifies the telephony signal and couples it to transmit antenna 621a. The signal is transmitted within the physical area for signal coverage of RAD 117 and is received by a remote wireless telephone (not shown) which is in this area.

The telephony signal input to bandpass filter 658 is divided by divider 656 and the sample is input to BIT and Power Monitor 657. The level of the telephony signal is reported to the microprocessor (not shown) which reports same to RASP 118 as part of the control signals. In addition, the output of power amplifier 659 is also sampled and input to BIT and Power Monitor 657 which reports the signal level to the microprocessor which in turn reports it to RASP 118. This signal level measurement is used in concert with attenuators 650 and 652, as controlled by RASP 118, to adjust the power level of the telephony signal to be applied to the transmit antenna. If the signal level output from power amplifier 659 is too high, and cannot be adjusted within specification by attenuators 650 and 652, microprocessor will shut down this RAD 117.

A portion of the signal output from bandpass filter and amplifier 646, and still including the control signals, is input to mixer 648 along with a signal from local oscillator 660. The output of mixer 648 is input to reference channel oscillator 662 and forward control channel circuit 661. Circuit 661 accepts only control signals sent from RASP 118 and sends them to the microprocessor. Control signals have a prefixed RAD address as part of the control signals and each RAD 117 has a unique address. Therefore, the microprocessor in each RAD 117 can recognize and accept only control signals directed to it from RASP 118.

When a RAD 117 receives control signals directed to it by RASP 118, the microprocessor responds thereto to perform the action required by RASP 118. The control signal may ask for the settings of the local oscillators and attenuators, and this information is returned to RASP 118 using a control signal oscillator as described herein. The control signal from RASP 118 may also indicate revised settings for local oscillators and attenuators. The microprocessor makes the required changes to the circuits and then sends a confirmation signal back to RASP 118 indicating that the requested changes have been made. As part of the gain control operation the control signal from RASP 118 may also request information concerning the outputs from bit and power monitor 657. Responsive to any of these control signals the microprocessor performs the requests.

Reference channel oscillator 662 processes the output of mixer 648 to obtain the reference oscillator signal sent from RASP 118, and generates a phase lock loop reference signal that is used to provide a master frequency to all local oscillators within RAD 117 to match their frequency of operation with RASP 118.

Figure 7:
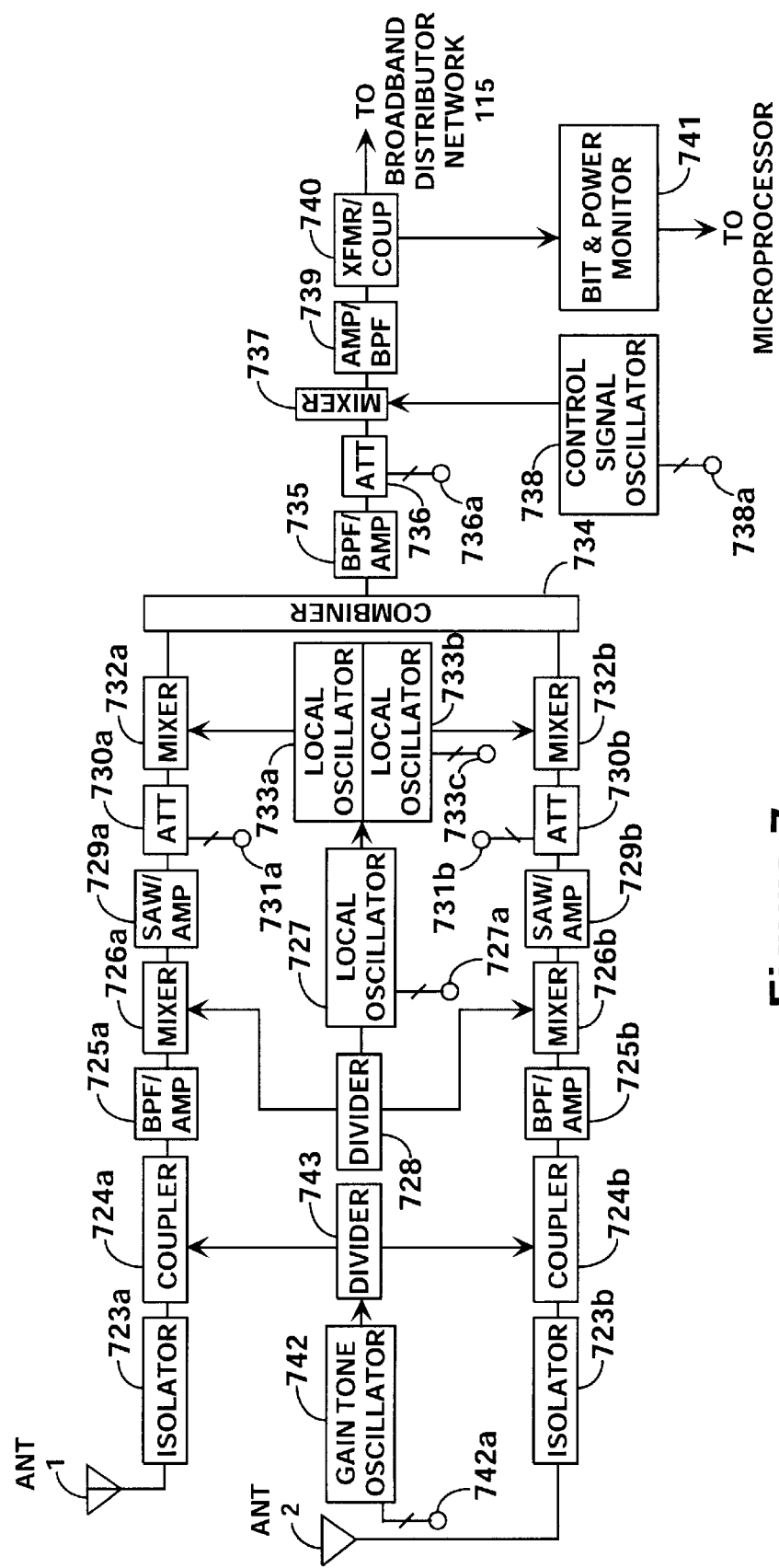
FIG. 7 is a detailed block diagram of the portion of a Remote Antenna Driver (RAD) that receives telephony signals from wireless telephones, and forwards the signals via the broadband distribution network to the RASP and BTS in accordance with the teaching of the present invention.

In FIG. 7 is shown a detailed block diagram of the upstream or reverse circuitry within Remote Antenna Driver (RAD) 117 that carries telephony signals from a wireless telephone (not shown), and via Broadband Distribution Network 115, to RASP 118.

Briefly, primary receive antenna 721b is connected to a first portion of the circuitry in FIG. 7, and that circuitry is identical to a second portion of the circuitry that is connected to diversity receive antenna 721c. The telephony signals received by both antennas 721b and 721c from a wireless telephone (not shown) are initially processed in parallel, then the two received signals are both frequency multiplexed together and both are returned via Broadband Distribution Network 115 to remote RASP 118 to be processed.

Telephony signals from a wireless telephone (not shown in FIG. 7) operating in the blind area 116 assigned to RAD 117b are received by primary receive antenna 721b. The signals are input to an isolator 723a which isolates antenna 721b from the downstream RAD circuit shown in FIG. 6. The received telephony signal is then input to directional coupler 724a that has a second signal input thereto from power divider 743 and gain tone oscillator 742 which are used for gain control measurement purposes.

The telephony signal (modulated RF carrier) received from a remote wireless telephone, and the gain tone, are applied via directional coupler 724a to a combined band pass filter and amplifier 725a. The signals are amplified and extraneous signals are filtered from the received telephony signal by bandpass filter 725a. The operation just described also applies to isolator 723b, coupler 724b and bandpass filter and amplifier 725b.

The amplified and filtered telephony signal is then input to mixer 726a which is used along with SAW filter 729a to assist in filtering of the spread spectrum, digital telephony signal. Mixer 726a also has input thereto a signal from local oscillator 727. This signal from local oscillator 727 is input to divider 728 which applies the signal to both mixers 726a and 726b while providing isolation between these two mixers.

The frequency of local oscillator 727 is digitally controlled and is determined by a binary control word applied to its control input 727a from a microprocessor (not shown), responsive to control signals received from RASP 118. Similarly, control signals from remote RASP 118 causes the microprocessor to set the frequency of digitally controlled local oscillators 733a and 733b.

The operation of mixer 726a results in multiple frequencies being output from the mixer as is known in the art, but due to the frequency of oscillator 727, most of the signals present at the input of RAD circuit 723a from antenna 721b are shifted far outside the band of frequencies which can pass through SAW filter 729a. Only the desired signals can pass through SAW filter 729a. This frequency shift also helps to prevent leak through of unwanted signals present at the input of circuit 723a because they are blocked by narrow bandpass filter 725a which is passing signals of a frequency far from the signals applied to SAW filter 729a. Due to the sharp filtering action of SAW filter 729a, even spurious signals close to the desired telephony and control tone signals are removed. The same filtering operation applies to mixer 726b and SAW filter 729b.

The filtered telephony signal is then amplified by amplifier 729a and input to step attenuator 730a which is used to adjust the gain level of the signal in one-half dB steps. The amount of attenuation provided by step attenuator 730a is controlled by a binary word at its control input 731a from the microprocessor (not shown). The control of step attenuators 730a, 730b, and 736 is accomplished responsive to control signals from RASP 118 as part of a gain control operation that assures that the signal level of telephony signals appearing at the input of RASP 118 from RAD 117 is within an acceptable range. Attenuator 730b in the parallel channel handling the telephony signals from diversity receive antenna 721c performs the same function.

The telephony signal that is output from step attenuator 730a is input to mixer 732a along with a fixed frequency signal from local oscillator 733a. Mixer 732a is used to shift the frequency of the telephony and gain tone signals to the frequency required to apply the signals to Broadband Distribution Network 115. This same operation applies to the telephony and gain tone signals output from mixer 732b.

The frequency of oscillators 733a and 733b is determined by binary words applied to their control input 733c. A control signal is sent from RASP 118 which causes the microprocessor to set the frequency of local oscillators 733a and 733b. The frequency of the telephony signal output from step attenuator 730a is the same as the frequency of the telephony signal output from step attenuator 730b. However, the frequency of local oscillator 733a is different from the frequency of local oscillator 733b. The result is that the RF carrier frequency of the telephony and gain tone signals output from mixer 732a is different than the RF carrier frequency of the telephony and gain tone signals output from mixer 732b. This is done so that both primary receive antenna 721b and diversity receive antenna 721c signals are both sent to RASP 118 and BTS 111 in frequency multiplexed form for processing. However, all carrier frequencies are within the frequency band of the assigned wireless telephony channel on Broadband Distribution Network 115.

The telephony signals received by primary receive antenna 721b and diversity receive antenna 721c are frequency multiplexed together and sent via Broadband Distribution Network 115 to RASP 118. To accomplish this, combiner 734 is utilized. Combiner 734 has the telephony and gain tone signals output from both mixers 732a and 732b input thereto. As described in the previous paragraph these two received telephony signals modulate carriers that are at different frequencies, but both frequencies are in an assigned channel of Broadband Distribution Network 115. Combiner 734 combines the two sets of signals so they are frequency multiplexed together.

The combined signal is input to bandpass filter and amplifier 735 which removes spurious frequencies created by the mixing action in circuits 732a and 732b, and amplifies the signals that pass through the filter. The combined and filtered telephony and gain tone signals are input to step attenuator 736 to adjust the gain level of the signals. Similar to the operation of the previously described step attenuators, this digitally controlled attenuator is set responsive to gain control signals received from remote RASP 118 as part of the gain control operation.

The frequency multiplexed telephony and gain tone signals output from step attenuator 736 are input to mixer 737 which has a second input from control signal oscillator 738. The frequency of control signal oscillator 738 is set responsive to a binary signal on its control leads 738a from the microprocessor. RASP 118 is the origin of the control signal used to set the frequency of control signal oscillator 738.

Responsive to different control signals received from RASP 118, the microprocessor (not shown) applies signals to control input 738a. These microprocessor signals cause control signal oscillator 738 to produce an information signal. The information signal indicates various information about RAD 117, but particularly including the settings of step attenuators 730a, 730b and 736, to RASP 118 as part of the gain control operation. RASP 118 uses this information to keep an updated status regarding RAD 117.

The output from mixer 737 now has five signals frequency multiplexed together to be returned via Broadband Distribution Network 115 to RASP 118. The signals are the telephony signal received by primary receive antenna 721b, the telephony signal received by diversity receive antenna 721c, the gain tone signal output from gain tone oscillator 742 as applied to both primary receive and diversity receive paths, and the system information signal output from control signal oscillator 738. This frequency multiplexed signal output from combiner 737 is input to band pass filter and amplifier 739 to remove any extraneous signals and amplify the desired signals before they are input to Broadband Distribution Network 115 and sent to RASP 118.

Transformer and coupler 740 is used to couple the frequency multiplexed signals described in the previous paragraphs to Broadband Distribution Network 115. The transformer 740 is an impedance matching transformer having 50 ohm primary and 75 ohm secondary windings. When Broadband Distribution Network 115 uses coaxial cable, the secondary winding of transformer 740 is wired in series with the center conductor of the coaxial The invention in accordance with claim I wherein cable. As previously described, RAD 117 hangs from the coaxial cabling of the Broadband Distribution Network 115 to which it is connected. In other applications, such as with fiber optic cable, other well known frequency conversion and signal coupling techniques are used.

A small portion of the frequency multiplexed signals passing through transformer and coupler 740 is coupled to Built In Test (BIT) and power monitor 741. Monitor 741 samples the signal level of the combined signals that are being input to Broadband Distribution Network 115 and reports this information to RASP 118 via control signal oscillator 738 which has been previously described. If the output signal level is too high and the level cannot be corrected, the microprocessor will shut down RAD 117 and report this to RASP 118.

While what has been described hereinabove is the preferred embodiment of the present invention, it may be appreciated that one skilled in the art may make numerous changes without departing from the spirit and scope of the present invention.

What is claimed is:

1. In a wireless telephone system that utilizes base transceiver stations, each having a tower mounted antenna, to carry telephony signals in assigned areas between wireless telecommunications devices and a telephone system, apparatus associated with each base transceiver station comprising:

a central transceiver connected to said base transceiver station via a directional coupler; and a remote transceiver located in a part of said base transceiver station assigned area, wherein said remote transceiver is connected to said central transceiver via a broadband distribution network, and wherein said remote transceiver and said central transceiver cooperate with said base transceiver station to provide adequate wireless telephony communications in said part of said assigned area.

2. The invention in accordance with claim 1 wherein telephony signals normally transmitted by said base transceiver stations and tower mounted antenna to a wireless telecommunications device located in said assigned area are also sent by said central transceiver to said remote transceiver to be transmitted to said wireless telecommunications device in said part of said assigned area.

3. The invention in accordance with claim 2 wherein telephony signals transmitted by said wireless telecommunications device operating in said part of said assigned area are received by said remote transceiver and sent to said central transceiver, said central transceiver sending said telephony signals from said wireless telecommunications device to said base transceiver station.

4. The invention in accordance with claim 1 wherein said broadband distribution network is used to carry telephony signals between said central transceiver and said remote transceiver.

5. The invention in accordance with claim 4, wherein said broadband distribution network includes a dedicated cable connected between said central transceiver and said remote transceiver.

6. The invention in accordance with claim 1, wherein said tower mounted antenna is connected to said base transceiver station via said directional coupler.

7. The invention in accordance with claim 6, wherein said central transceiver is connected to said base transceiver station via a plurality of directional couplers.

8. The invention in accordance with claim 7, wherein said central transceiver includes a plurality of channel circuits, and wherein each said channel circuit is connected to a channel circuit of said base transceiver station via one of said plurality of directional couplers.

9. The invention in accordance with claim 8, wherein said tower mounted antenna includes a set of antennas, wherein each antenna of said set of antennas is connected to one of said plurality of channel circuits of said base transceiver station via one of said plurality of directional couplers.

10. The invention in accordance with claim 4, wherein said broadband distribution network includes a hybrid fiber coaxial cable connected between said central transceiver and said remote transceiver.

11. The invention in accordance with claim 4, wherein said broadband distribution network includes a dedicated fiber optic cable connected between said central transceiver and said remote transceiver.

12. A method for providing wireless telephone service in an area in which wireless telephony service is provided by a base transceiver station with a tower mounted antenna which carries telephony signals between wireless telecommunications devices operating in said area and a telephone system, said method comprising:

transmitting a telephony signal from said base transceiver station to a remote transmitter physically located in a part of said area at the same time said telephony signal is transmitted to a wireless telecommunications device that is operating in said part of said area using said tower mounted antenna; and re-transmitting said telephony signal to said wireless telecommunications device using said remote transmitter.

13. The method in accordance with claim 12 further comprising:

receiving a telephony signal that originated from said wireless telecommunications device using said remote transmitter; and sending said received telephony signal from said remote transceiver to a central transmitter to be forward to said base transceiver station while the telephony signal that originated from said wireless telecommunications device is received by said tower mounted antenna.

14. The method in accordance with claim 13 further comprising:

providing the telephony signal from said wireless telecommunications device and received by said tower mounted antenna to said base transceiver station; and forwarding said telephony signal being transmitted to said wireless telecommunications device using said tower mounted antenna to said central transceiver to be forwarded to said remote transceiver for transmission to said wireless telecommunications device.

* * * * *